R. E. HELLMUND.
CONTROL SYSTEM.
APPLICATION FILED SEPT. 8, 1914. RENEWED APR. 19, 1919.
1,320,058. Patented Oct. 28, 1919.
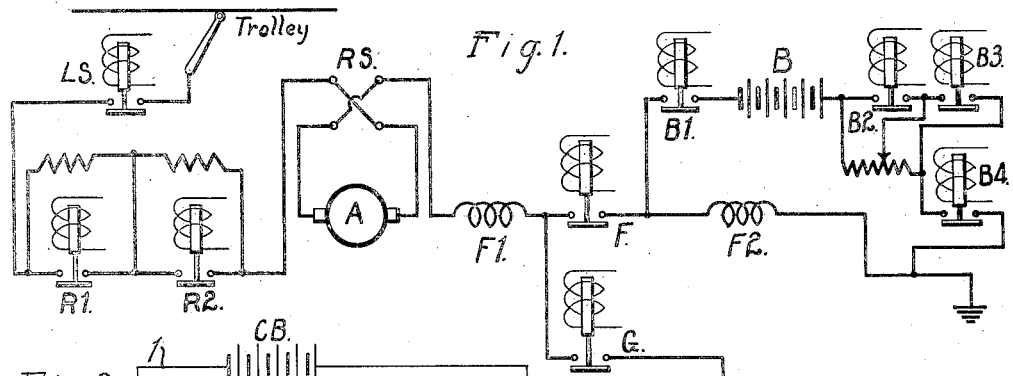
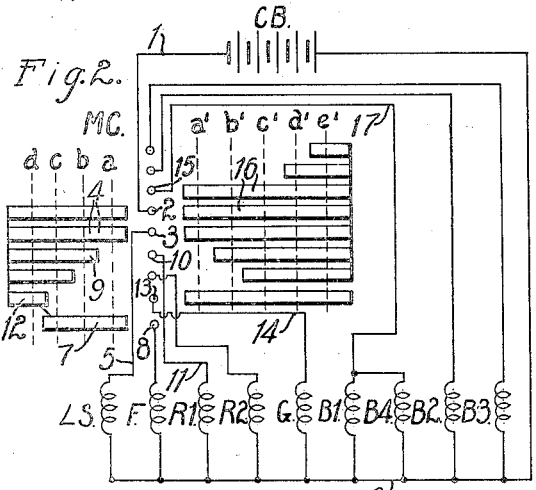
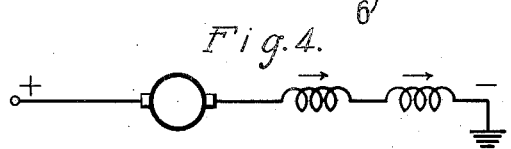
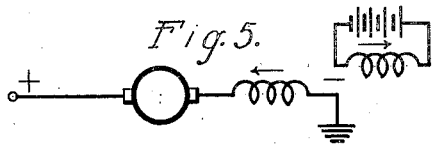
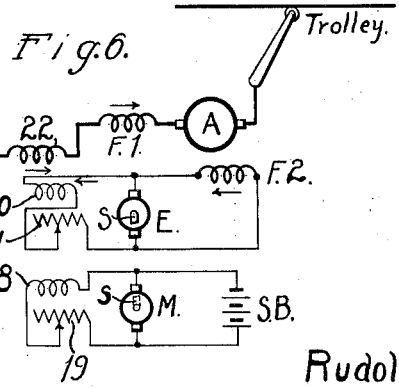
WITNESSES:
R. J. Fitzgerald
W. R. Coley
INVENTOR
Rudolf E. Hellmund.
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,320,058.  Specification of Letters Patent.  Patented Oct. 28, 1919.

Application filed September 8, 1914, Serial No. 860,612. Renewed April 19, 1919. Serial No. 291,410.

*To all whom it may concern:*

Be it known that I, RUDOLF E. HELLMUND, subject of the German Empire, and a resident of Swissvale, in the county of Allegheny and State of Pennsylvania, have invented a new and useful Improvement in Control Systems, of which the following is a specification.

My invention relates to systems of control, and it has special reference to electric railway systems of the type that are adapted to regeneratively supply current to the supply circuit when the motors embodied in the system are driven by the momentum of the vehicle.

The object of my invention is to provide a relatively simple, inexpensive and effective means of the above-indicated character which shall secure to the system all the familiar advantages of regenerative systems.

Heretofore electric railway systems employing regeneration have encountered certain difficulties because of voltage fluctuations in the supply circuit. Regeneration has been effected in many instances by exciting the motor field magnet winding by a battery or other suitable source and connecting the motor to the supply circuit when the current through the field magnet winding has been regulated to a predetermined value to cause the voltage generated by the momentum-driven motor to exceed the supply-circuit voltage by a certain value. Such a system will operate quite satisfactorily while the supply-circuit voltage remains substantially constant. However, if the voltage should decrease suddenly, for example, the regenerated current would assume a relatively high value which might be harmful to the motor, and at the same time, might cause braking torques which would be undesirable, for other reasons. The opposite action takes place if the supply-circuit voltage suddenly increases, as will be understood. Such conditions may be avoided by regulation of the field current of the motor by variation of the battery voltage. However, so far as I am aware, no simple and effective automatic switching apparatus which will act quickly enough to give proper regulation has been devised.

According to my present invention, therefore, I provide a dynamo-electric machine with preferably a multipart field magnet winding, such, for example, as that employed in "field control" systems of a familiar type, one part of which is connected to a suitable auxiliary source of energy, such as a storage battery or motor-generator set, for aiding regenerative operation of the armature, and the other portion of which is connected in series with the machine armature during regeneration, the two portions of the field winding being disposed to act in opposition to each other. With such a system, if the supply-circuit voltage suddenly decreases, the regenerated current will correspondingly tend to increase, thereby increasing the effect of that portion of the field winding which is connected in circuit with the machine armature and thus decreasing the effective value of field ampere-turns or flux in the motor. The increase of the regenerated current will, consequently, be much less than would be the case if the various portions of the field winding were not disposed to oppose each other. Conversely, if the supply-circuit voltage suddenly increases, an opposite action on the regenerated machine current will occur. As before noted, my system will not embody any special complicated set of connections, inasmuch as a machine of the well-known "field-control" type may readily be adapted for use in regeneration.

In the accompanying drawing, Figure 1 is a diagrammatic view of the main circuits of a system of control embodying my invention; Fig. 2 is a diagrammatic view of a suitable auxiliary control system for manipulating the various motor-controlling switches shown in Fig. 1, in accordance with the sequence chart of well known form that is illustrated in Fig. 3; Figs. 4 and 5 are simple diagrammatic views illustrating certain sets of connections of the system shown in Fig. 1; and Fig. 6 is a diagrammatic view of a modification of my invention.

Referring to Fig. 1 of the drawing, the system here shown comprises a supply-circuit conductor marked "Trolley;" a return-circuit conductor marked "Ground;" a dynamo-electric machine provided with an armature A and a field magnet winding comprising two parts F1 and F2; an auxiliary source of energy, such as a battery B, for exciting the portion F2 of the field winding, under predetermined conditions; a reversing switch RS, of familiar form, for reversing the electrical relations of the armature A with respect to the field winding; a plurality of motor-controlling switches LS, F, and G; an accelerating resistor, the sections of which are respectively adapted to be short-circuited by switches R1 and R2; a plurality of switches B1 and B4 for controlling the connections of the battery B; and a battery-circuit resistor, the sections of which are respectively adapted to be short-circuited by switches B2 and B3.

Referring now to Fig. 2, the auxiliary control circuits shown comprise a suitable master controller MC which is adapted to assume a plurality of motor-controlling positions $a$ to $d$, when operated in one direction, during acceleration of the motor, and a plurality of positions $a'$ to $e'$, when operated in the other direction, during regeneration; a suitable auxiliary source of energy, such as a control battery CB; and the actuating coils of the various switches illustrated in Fig. 1.

Assuming the various parts of the system to occupy the positions shown in the drawing, the operation of the system may be described as follows: When the master controller MC is moved to its first position $a$, a circuit is established from one terminal of the control battery CB through conductor 1, control fingers 2 and 3, which are bridged by a contact segment 4 of the master controller, conductor 5, the actuating coil of the switch LS, and the conductor 6 to the opposite side of the battery. Another circuit is established from an energized contact segment 7 of the master controller through control finger 8, the actuating coil of the switch F and the conductor 6. The motor is thus connected across the supply circuit, with the entire accelerating resistor in series therewith, and the two portions F1 and F2 of the field magnet winding are connecting in series-circuit relation.

If the master controller is moved to its position $b$, an energized contact segment 9 engages a control finger 10, from which point the circuit is completed through conductor 11 and the actuating coil of the resistor-short-circuiting switch R1 to the negative conductor 6. Upon the actuation of the master controller to its position $c$, the actuating coil of the switch R2 is similarly energized. The various portions of the accelerating resistor are thus successively short-circuited to effect a gradual acceleration of the motor, as is customary practice. If the master controller is moved to its final running position $d$, an energized contact segment 12 engages a control finger 13, whence circuit is established through conductor 14 and the actuating coil of the switch G to the negative control conductor. Substantially simultaneously with the engagement of the segment 12 and the finger 13, the segment 7 disengages the finger 8: the switch G is thus closed and the switch F is opened, thereby excluding the portion F2 of the field magnet winding from circuit to effect a further acceleration of the motor, in accordance with well-known principles.

Assuming that the motor is operating above a predetermined speed, which is suitable for regenerative purposes, and that the master controller is then moved to its position $a'$, a circuit is established from control fingers 2 and 15, which are bridged by a contact segment 16, conductor 17, and the actuating coils of the switches B1 and B4 to the conductor 6. The battery B is thus connected in circuit with the entire battery-circuit resistor across the portion F2 of the field magnet winding to energize it in a predetermined direction, for aiding the regenerative operation of the armature. The switches LS and G are also energized in the position $a'$ of the master controller, in a manner similar to that hereinbefore described. The armature A, portion F1 of the field magnet winding and the entire accelerating resistor are thus connected to regeneratively supply current to the supply circuit, the current through the portion F1 of the field winding being in such a direction as to oppose the action of the portion F2, which is excited by the battery B at a predetermined relatively constant voltage. If the controller is successively moved to its position $b'$ and $c'$, the switches R1 and R2 are progressively closed in a manner similar to that already pointed out.

In order to maintain a substantially constant regenerated current as the motor speed decreases, the master controller may be successively moved to its positions $d'$ and $e'$, thereby respectively closing the battery-circuit resistor short-circuiting switches B2 and B3, and correspondingly increasing the strength of the field current in the portion F2 of the field winding.

The connections of the final running position of the motor during acceleration are indicated in Fig. 4, the direction of the current in the two portions of the field winding being indicated by arrows. The final regenerative connections of the motor are similarly indicated in Fig. 5.

Since the operation of the system with respect to fluctuations of the supply-circuit voltage has been already set forth, no further description thereof will be given. It will be understood that, although I have shown and described my invention in connection with a simple and familiar form of control, the invention is not restricted to any particular system.

Referring now to the modification of my invention shown in Fig. 6, the system illustrated comprises the armature A, the field magnet winding having the portions F1 and F2, the supply circuit having its respective conductors marked "Trolley" and "Ground," and a motor-generator set preferably comprising a shunt motor M, which may be driven by a storage battery SB or other suitable source of energy, and a shunt generator E for exciting the portion F2 of the field winding during regeneration. The motor and generator may be coupled together in any suitable manner, as by a shaft s. The motor is preferably provided with a shunt field winding 18, the current through which may be varied by a suitable variable resistor 19, and the generator E is similarly provided with a shunt field winding 20 and a resistor 21. A series field winding 22 for the generator E is connected in series-circuit relation with the armature A and the portion F1 of the field winding of the main motor. During regeneration the field windings F1 and F2 of the main motor, and the field windings 20 and 22 of the generator E, are disposed to act differentially, as indicated by the arrows.

The operation of the system shown in Fig. 6, during fluctuation of the supply-circuit voltage, is somewhat similar to that hereinbefore described, and a brief exposition thereof will, therefore, be all that is necessary. Assuming that the supply-circuit voltage suddenly decreases, the regenerated current will tend to increase correspondingly, and the combined differential action of the strengthened series field winding 22 and the self-excited shunt field winding 20 will be such as to decrease the effective exciting flux of the generator E. The excitation of the portion F2 of the main motor field winding will be thereby correspondingly decreased, with the result that the voltage of the armature A and the regenerated current will also tend to decrease in substantially the same proportion. The incipient rise of regenerated current is, therefore, held down to a relatively low value.

I do not wish to be restricted to the specific circuit connections or arrangement of parts herein set forth, but desire that only such limitations shall be imposed as are indicated in the appended claims.

I claim as my invention:

1. In a control system, the combination with a supply circuit, and a dynamo-electric machine having an armature and a multi-part field magnet winding, of means for regeneratively connecting the armature and a portion of the field winding to the supply circuit, and an auxiliary driven dynamo-electric machine for energizing a second portion of said field winding and adapted to be influenced by variations in armature current to oppositely vary the current in said second portion of the field winding.

2. In a control system, the combination with a supply circuit, and a dynamo-electric machine having an armature and a multi-part field magnet winding, of means for regeneratively connecting the armature and a portion of the field winding to the supply circuit, and an auxiliary electric generator connected to energize the remaining portion of said field winding and provided with a self-excited field magnet winding and a differentially wound field winding connected in circuit with said armature.

3. In a control system, the combination with a supply circuit, and a dynamo-electric machine having an armature and a multi-part field magnet winding, of means for regeneratively connecting the armature and a portion of the field winding to the supply circuit, an auxiliary electric generator connected to energize the remaining portion of said field winding and provided with a self-excited field winding and a field winding connected in the regenerative circuit to oppose said self-excited winding and vary the current in said remaining portion of said first field winding oppositely to the regenerated current variations, an electric motor for driving said generator, and an auxiliary source of energy for supplying said motor.

4. In a control system, the combination with a supply circuit and a dynamo-electric machine having an armature and a field-magnet winding, of means for regeneratively connecting the armature to the supply circuit, and an auxiliary driven dynamo-electric machine having a plurality of differentially-energized field-magnet windings that are conjunctively adapted to vary the main armature voltage oppositely to the incipient changes of regenerated current.

5. In a control system, the combination with a supply circuit and a dynamo-electric machine having an armature and a field-magnet winding, of means for regeneratively connecting the armature to the supply circuit, and an auxiliary driven dynamo-electric machine for energizing said main field winding and having a plurality of differentially-disposed field-magnet windings that are respectively energized in accordance with the main armature current and the auxiliary machine voltage.

6. In a control system, the combination with a supply circuit and a momentum-driven dynamo-electric machine having an armature and a field-magnet winding of the series type, of means for regeneratively connecting the armature to the supply circuit, an auxiliary generating machine connected to energize said main field winding and provided with a self-excited field winding and a field winding connected in the regenerative circuit to oppose said self-excited field winding, an electric motor for driving said generating machine, and an auxiliary source of energy for supplying said motor.

7. In a control system, the combination with a supply circuit and a dynamo-electric machine adapted for both accelerating and regenerative operation, of means operative during the regenerative period for directly and inherently aiding to effect a compensating variation of regenerated voltage upon an incipient change thereof in either direction, and other means for indirectly and inherently aiding to effect such compensation.

8. In a control system, the combination with a supply circuit and a dynamo-electric machine adapted for both acceleration and regeneration and having an armature and a plural-section field-magnet winding, of means for so connecting and energizing one of said field winding sections that inherently relatively rapid partial compensations for incipient regenerated voltage fluctuations obtain, and means for so connecting and energizing the other field-winding section that inherently slightly less rapid partial compensations for said fluctuations obtain.

9. In a control system, the combination with a supply circuit and a dynamo-electric machine adapted for both acceleration and regeneration and having an armature and a plural-section field-magnet winding, of means for connecting one of said field-winding sections in series relation with said armature to inherently provide relatively rapid partial compensations for incipient regenerated voltage fluctuations, and an auxiliary dynamo-electric machine for energizing the other field-winding section differentially to the first section and having a plurality of field windings differentially energized respectively in accordance with the regenerated current and the auxiliary machine voltage, whereby slightly less rapid partial compensations for said fluctuations obtain.

In testimony whereof I have hereunto subscribed my name this 26th day of Aug., 1914.

RUDOLF E. HELLMUND.

Witnesses:
G. R. IRWIN,
B. B. HINES.